United States Patent [19]

Fellner

[11] Patent Number: 5,587,037
[45] Date of Patent: Dec. 24, 1996

[54] MULTI-LAYER SHEET MATERIAL HAVING A REFRACTIVE SURFACE AND METHOD FOR MAKING SAME

[75] Inventor: Alan E. Fellner, Macedonia, Ohio

[73] Assignee: Custom Graphics, Solon, Ohio

[21] Appl. No.: 344,566

[22] Filed: Nov. 23, 1994

[51] Int. Cl.[6] .................................................. B44C 1/165
[52] U.S. Cl. ........................... 156/231; 156/59; 156/209; 156/233; 156/235; 156/219; 156/272.2; 156/277; 156/297; 156/300
[58] Field of Search ............................. 156/277, 59, 209, 156/249, 297, 300, 231, 233, 220, 235, 219, 272.2

[56] References Cited

U.S. PATENT DOCUMENTS

| | | | |
|---|---|---|---|
| 1,996,539 | 4/1935 | Dufay | 41/19 |
| 2,104,790 | 1/1938 | Casto | 41/26 |
| 3,011,383 | 12/1961 | Sylvester et al. | 88/1 |
| 3,180,779 | 4/1965 | Conger et al. | 161/6 |
| 3,480,500 | 11/1969 | Hotter | 156/220 |
| 3,510,388 | 5/1970 | Hunt et al. | 161/119 |
| 3,567,538 | 3/1971 | Lind | 156/154 |
| 4,084,032 | 4/1978 | Pasersky | 428/172 |
| 4,198,457 | 4/1980 | Saito et al. | 428/161 |
| 4,503,110 | 3/1985 | Skene | 428/164 |
| 4,933,218 | 6/1990 | Longobardi | 428/38 |
| 5,082,703 | 1/1992 | Longobardi | 428/38 |
| 5,106,216 | 4/1992 | Kim | 400/185 |

FOREIGN PATENT DOCUMENTS

3810015 A1  10/1989  Germany.

Primary Examiner—Donald Loney
Attorney, Agent, or Firm—D. Peter Hochberg; Mark Kusner; Michael Jaffe

[57] ABSTRACT

A process for producing a multi-layer sheet material having a refractive foil layer therein. The multi-layer sheet material providing an image having depth, dimension, contrasts, glow and brilliance.

8 Claims, 1 Drawing Sheet

MULTI-LAYER SHEET MATERIAL HAVING A REFRACTIVE SURFACE AND METHOD FOR MAKING SAME

FIELD OF THE INVENTION

The present invention is related generally to a multi-layer sheet material having a refractive surface and a method for producing same. In particular, the present invention relates to a multi-layer sheet material having a refractive metal foil sheet therein for reflecting and bending light, and a method for producing the multi-layer sheet material.

BACKGROUND OF THE INVENTION

It has become increasingly common in the printing industry to produce multi-layered printed sheet materials having special visual effects. These printed sheet materials include trading cards, phone cards, post cards, greeting cards, posters and the like. Prior art processes do not allow for fast and efficient production of such a multi-layered printed sheet material. In prior art methods of producing such printed sheet materials, it is necessary for ink applied to a layer of the sheet material to completely dry before the sheet material can be stacked for further processing. In this regard, the wet ink on the sheet material becomes smeared, smudged or distorted when a second sheet material is placed on top of the wet ink. Accordingly, the prior art methods require a long ink dry-time before the sheet material can be stacked for further processing. This long ink dry-time slows the production process and increases inefficiency.

Furthermore, in prior art production methods stacking of the sheet material during processing also creates handling problems. In this respect, whenever the sheet materials are stacked, the lack of a separation between consecutive sheets in the stack, creates difficulties in separating individual sheets for further processing. This difficulty also slows production and creates inefficiency in the manufacturing process.

Furthermore, prior art multi-layered printed sheet materials do not reflect light so as to produce an image having depth, dimension, contrasts, glow and brilliance. In this respect, the prior art printed sheet materials reflect light in a manner which typically gives the image on the sheet material a flat, one-dimensional, dull appearance.

The present invention overcomes these and other drawbacks of the prior art sheet material production methods and the prior art sheet materials.

SUMMARY OF THE INVENTION

It is an object of the present invention to provide an improved process for making a multi-layer sheet material that reflects, refracts and bends light to produce an image having depth, dimension, contrasts, glow and brilliance.

It is an object of the present invention to provide a process for making a multi-layer sheet material, wherein the sheet material may be stacked before the ink thereupon has dried.

Another object of the present invention is to provide a process for making a multi-layer sheet material, wherein the sheet material may be unstacked easily and efficiently.

It is another object of the present invention to provide a multi-layer sheet material having a refractive foil layer.

It is still another object of the present invention to provide an improved multi-layer sheet material that reflects, refracts and bends light to create an image having depth, dimension, contrasts, glow and brilliance.

It is still another object of the present invention to provide a multi-layer sheet material having a high gloss outer coating to enhance the appearance of an image on the sheet material.

It is yet another object of the present invention to provide a multi-layer sheet material having a protective outer layer.

A general object of the present invention to provide an improved multilayer printed product having a refractive foil and having increased depth, dimension, contrasts, glow and brilliance, which is effective in use, and a process for making the product, which is effective, efficient and practicable.

These and other objects will become apparent from the following description of a preferred embodiment taken together with the accompanying drawings.

The invention comprises a printed product comprised of a sheet media, a refractive metal foil, a first laminate layer, printing ink, an aqueous coating, a second laminate layer, and a high gloss coating. The process for making this product includes the following steps: stamping a metal foil to bond the foil to a sheet media and impress a design on the foil, applying a first laminate to protect the foil, printing over the laminate with inks to provide a color image, applying an aqueous coating to seal the inks while drying, applying a spray powder to form a separation layer, applying a second laminate to protect the inks and enhance the image, applying a high gloss coating to enhance the appearance of the image, and applying the spray powder to form a separation layer.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof and wherein.

DETAILED DESCRIPTION OF THE PREFERRED EMBODIMENT

Figure 1:
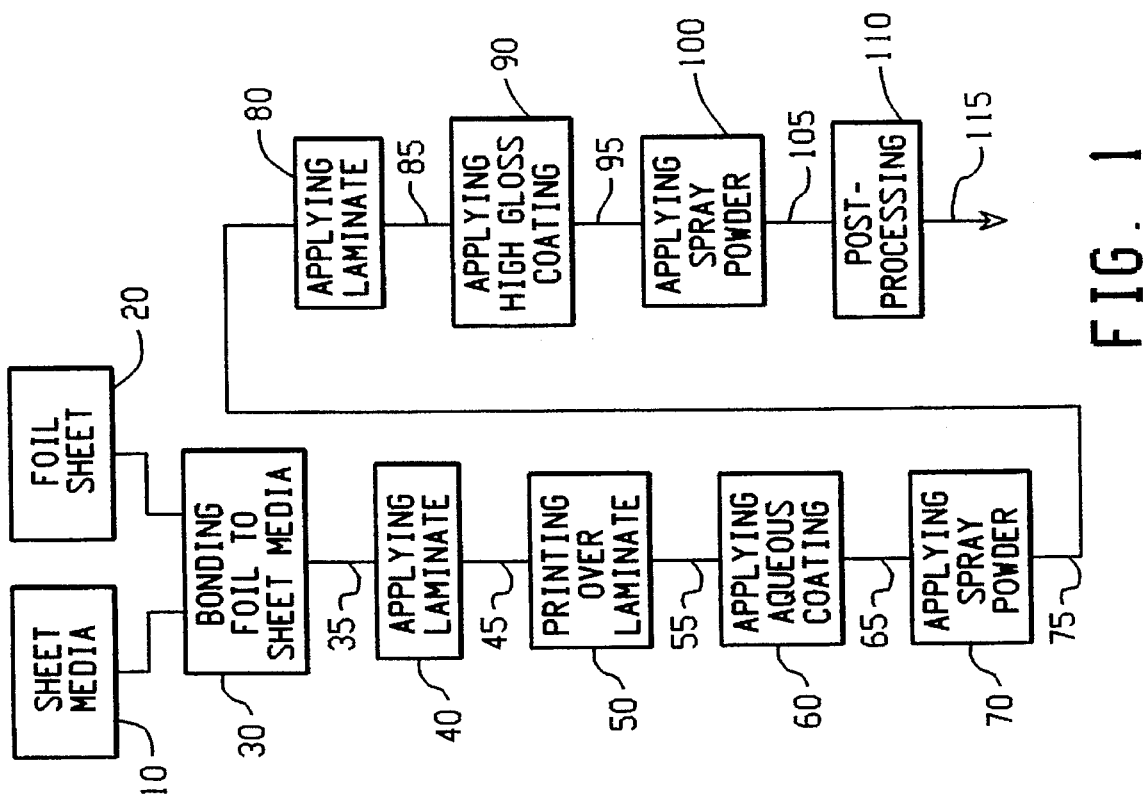
FIG. 1 is a block diagram representing the steps of a preferred embodiment of the present invention for producing a multi-layer sheet material.

Referring now to the drawing wherein the showing is for the purpose of illustrating a preferred embodiment of the invention only, and not for the purpose of limiting same, FIG. 1 shows a block diagram illustrating the basic steps of the preferred method of the present invention.

Figure 2:
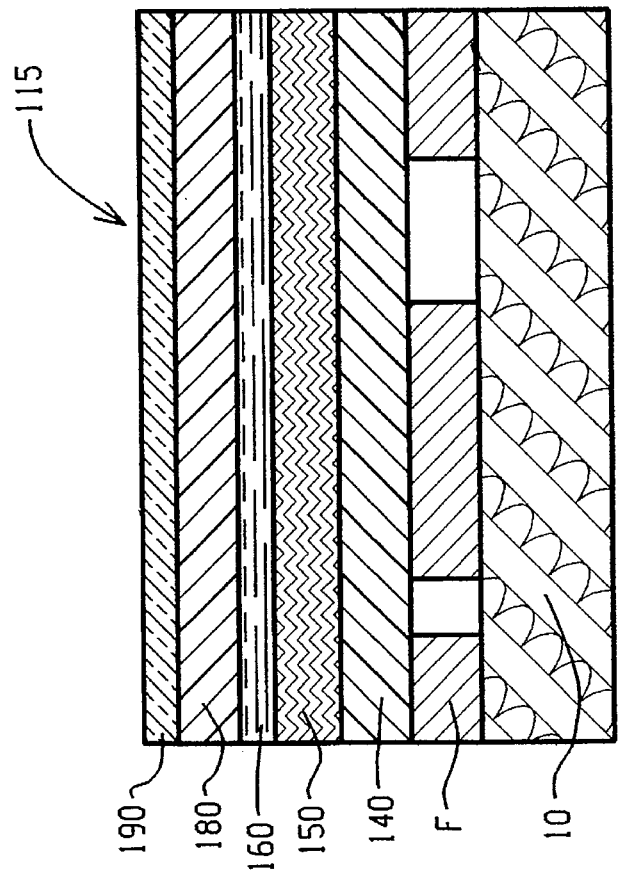
FIG. 2 is a cross-sectional view of a preferred embodiment of the multilayer sheet material, as produced by the steps shown in FIG. 1.

A sheet media 10 is provided with a refractive foil F by bonding the foil F thereto. The sheet media and the foils are generally fed as individual sheets to a press, which will be described in greater detail below. Sheet media 10 and foil F are shown in FIG. 2. Sheet media 10 may comprise paper, plastic or the like.

Referring now to step 30, foil F is bonded to sheet media 10 by hot stamping the foil F thereon from a foil sheet 20 including a transfer carrier, release coating, and foil F. Foil sheet 20 with foil F thereon is positioned adjacent to sheet media 10 in a foil stamping press. A preferred stamping press is the Kluge-EHE stamping and embossing press, which provides 55 tons of impressional strength over an area of approximately 14×20 inches. This stamping press is similar to a conventional sheet-fed automatic platen letterpress without an inker.

The stamping press is comprised of a base having an upper face for supporting the sheet media 10 and a movable heated copper or brass plate die having a design etched therein. The die is preferably parallel to the sheet supporting base and movable in a known manner towards the base. The die is pressed against the carrier material to transfer the foil F to sheet media 10. Foil F forms a metal foil design shape on sheet media 10, wherein the design shape corresponds to reliefs in the surface of the brass plate die. The bonded sheet with the design is designated by the numeral 35. The reliefs in the die may be hand etched or etched using an acid solution. Broad outline reliefs provide the shape of the design (i.e., the design outline) on the foil, while finer reliefs provide refractive surfaces on the foil which reflect, refract and bend light in interesting and decorative ways.

With regard to foil sheet 20, the carrier is generally made of a thin tough plastic material such as cellulose acetate, cellophane and a polyester. The foil F is preferably a metal silver foil having a thickness in the range of 0.125 mil to 1.0 mil, and has a highly reflective face which is visible on the finished product. Examples of suitable foil sheets include silver foil sheets manufactured by Astor Universal (product code No. MSP5900) and Nakai International Corp. (product code No. PPI). The foregoing foil sheets have a thickness of approximately 0.5 mil. It will be appreciated that foils of other colors, such as gold or bronze, and having different thicknesses are also contemplated for use in the present invention. The release coating melts when the heated die contacts the carrier so that the release coating separates the foil F and any other coatings from the carrier.

When desired, there may be other coatings on the foil sheet 20, the number of coatings generally depending on the requirement for hot stamping the particular sheet media 10. For instance, there may be a lacquer coating, as well as color coatings to add desired effects to foil F.

In transferring foil F to sheet media 10, the heated die is brought down toward the base plate of the stamping press for a suitable dwell time and pressure to remove foil F from the carrier and bond foil F to sheet media 10. The dwell time is determined by the temperature of the die, the relief characteristic of foil F (i.e., how easily the foil F adheres to the sheet media 10) and the operating speed of the stamping press.

Referring now to step 40, a laminate 140 is applied over the entire top surface of bonded sheet 35. Laminate 140 provides a coating over foil F that has been bonded to sheet media 10. In this respect, laminate 140 protects the foil from peeling and from being scratched during subsequent processing. Laminate 140 is applied like cellophane tape over the surface of bonded sheet 35. Bonded sheet 35 and laminate 140 are pressed between a pair of rollers. Heat is then applied to adhere laminate 140 to the top surface of bonded sheet 35, to create a laminated sheet 45.

Laminate 140 generally has a thickness in the range of approximately 1.5 mil to 5.0 mil. However, other thickness dimensions are suitable as well. A preferred laminate is a plastic laminate manufactured by General Binding Corporation of Addison, Illinois under the trade name NAP II. NAP II is a polyester/EVA laminate comprised of polyethylene terephthalate (PET) and ethylene vinyl acetate copolymer (EVA). It will be appreciated that other laminates, including NAP III (discussed below), are also suitable.

Referring now to step 50, laminated sheet 45 having foil F and laminate 140 thereon is fed through an offset printing press to apply a four-color image on top of laminate 140, to yield a printed sheet 55. This printing process is performed by utilizing cyan, magenta, yellow and black separations and plates. Accordingly, inks are placed on laminate 140 to provide a printed image. It should be noted that the printed image may or may not cover all portions of sheet media 10 having foil F thereon. In this respect, some or all of foil F may appear uncolored in the final product. Accordingly, selective placement of inks on laminate 140 can provide significant contrasts. It will be appreciated that the offset printing press is conventional in the prior art. Examples of suitable printing presses include the Heidelberg Speedmaster offset printers (model nos. 72S+L and 102S+L). It will also be appreciated that printing processes other than a four-color ink printing process are also suitable, including printing processes which use fewer or greater numbers of ink colors.

Immediately following the printing step 50, an aqueous coating 160 is applied over the wet inks of sheet 55 at step 60, to create a sealed sheet 65. Aqueous coating 160 provides a quick-drying sealant. This sealant prevents smearing, smudging or distortion of the wet inks as sealed sheet 65 is stacked for further processing. Since aqueous coating 160 dries faster than the inks below it dry, thus sealing the inks. It will be appreciated that aqueous coating 160 is porous to allow complete drying of the inks beneath it. The quickly formed seal also allows sealed sheet 65 to be handled soon after the inks have been applied, without a risk of smudging, smearing or distorting the inks. In this regard, aqueous coating 160 allows handling and stacking of sealed sheet 65 before the inks have dried. Furthermore, aqueous coating 160 provides a transparent layer which gives additional depth to the final product. Accordingly, the image formed on sheet media 10 has an enhanced appearance due to aqueous coating 160.

The aqueous coating is preferably an acrylic emulsion manufactured by Algan, Inc. of Chagrin Falls, Ohio and sold under the trade name ALGLOSS OVERCOATING (product code 3056M-3). This aqueous coating is comprised of styrene/acrylic copolymers and ammonium hydroxide. It will be appreciated that aqueous coatings with similar properties are suitable as well.

Immediately following application of aqueous coating 160, a spray powder is applied to the surface of sealed sheet 65 over aqueous solution 160 at a step 60, to produce a powdered sheet 75. The offset printer includes a spray unit that uses compressed air to dispense the spray powder onto sealed sheet 65. The spray powder is in the form of small dust-like particles or granules. On the top surface of sealed sheet 65 the granules or particles provide a virtually invisible layer. The spray powder provides a separation layer between sheets as they are stacked one on top of the other. In this respect, the spray powder provides a thin layer between the top surface of one powdered sheet 75 and the bottom surface of a powdered sheet 75 stacked thereupon. This layer allows for easy handling of stacked sheets. The spray powder also prevents ink set-off. In this respect, the spray powder prevents wet inks from sticking or adhering to the bottom surface of a powdered sheet 75 stacked thereupon. The spray powder melts into the aqueous coating and dries into the inks. The preferred spray powder is a spray powder manufactured by Varn Products Company, Inc. of Oakland, N.J. and sold under the product name ANTI SET-OFF POWDERS (product No. R-23). The term "anti set-off" refers to prevention of ink set-off. This powder is comprised of starch. It will be appreciated that other spray powders with similar properties are suitable as well.

A typical dry time for the inks is approximately 72 hours. However, much shorter dry times have been found to be sufficient. Referring now to step 80, after the inks have dried, a second laminate 180 is applied over the top surface of sheets 75 having foil F, laminate 140, and inks 150 thereupon, to produce protected sheets 85. This laminate provides a coating that protects the dried ink and gives the image on sheet media 10 an enhanced appearance of depth. Laminate 180 generally has a thickness of approximately 1.5 mil to 5.0 mil. However, it will be appreciated that other thickness dimensions are also suitable.

It should be noted that when greater thickness in the final product is desired it is preferable to use thicker laminates for laminates 140 and 180, rather than thicker sheet media. In this respect, it has been found in the case of paper sheet media that thicker paper is generally of lower quality, and thus is not as durable as thinner paper during the processing steps. A preferred laminate material is a plastic laminate manufactured by General Binding Corporation of Addison under the trade name NAP III. NAP III is a polypropylene/EVA laminate comprised of ethylene vinyl acetate (EVA) copolymer polypropylene, homopolymer, propylene copolymers and inorganic additives. It will be appreciated that other laminates are also suitable, including NAP II discussed above. Laminate 180 is applied in the same manner as discussed with respect to laminate 140 in step 40.

Immediately following step 80, a high gloss coating 190 is applied over the surface of second laminate 180, to yield a glossed sheet 95. High gloss coating 190 gives the underlying foil F and inks 150 an enhanced appearance of depth, dimension, contrast, glow and brilliance by providing a high gloss surface over laminate 180. High gloss coating 190 is initially in the form of a liquid and is applied to laminate 180 using conventionally known high speed roll coaters or blanket coaters.

Coating 190 is preferably an ultraviolet (UV) curable high gloss coating manufactured by Pierce and Stevens of Buffalo, N.Y. and sold under the trade name MIRACURE UV CURABLE HIGH GLOSS COATING (product No. J9344F). MIRACURE is comprised of monomeric multifunctional acrylates, tripropylene glycol diacylate, benzophenone, and acrylate ester of bisphenol-a-epoxy. The cure rate of this high gloss coating is 150 fpm using a 200 watt/inch lamp.

Referring now to step 100, after coating 190 has cured, spray powder is applied over the top surface of glossed sheet 95 having coating 190, to produce a final spray sheet 105. This spray powder is the same as the spray powder applied in step 70, and is applied in the same manner. As in step 70, spray powder provides a separation layer between the top surface of a final spray sheet 105 and the bottom surface of a second final spray sheet 105 stacked thereupon. In this respect, the spray powder provides a thin layer of dust-like granules or particles between the top surface of one final spray sheet 105 and the bottom surface of a second sheet 105 stacked thereupon. This thin layer allows for easier handling of stacked sheets.

During the post-processing step 110, the final spray sheet 105 are stacked, and cut to size to form a multi-layer refractive sheet 115. In this respect, each sheet 105 may have a plurality of cards, posters, or other material of various dimensions printed thereon. Accordingly, sheet 105 may be cut to produce a plurality of individual cards, posters or the like. For instance, a sheet 105 measuring 14×20 inches or 28×40 inches may be cut to produce individual cards 115 being 1×1 inch square or 1-⅝ inch diameter round.

Although the foregoing process has been described in connection with only one side of a sheet media, the foregoing process can be effectively applied to both sides of the sheet media. Alternatively, the second side of the sheet media can simply be printed in four-color process utilizing offset lithography and applying a laminate and a high gloss coating over the printed image. For instance, the printing step for the second side can be performed prior to bonding the foil to the first side of the sheet media, or it can be performed just prior to the printing step for the first side of the sheet media.

Referring to FIG. 2, there is shown the multi-layer sheet material or refractive sheet 115 resulting from the foregoing process. The layers are comprised of a sheet media 10, foil F, laminate 140, inks 150, aqueous coating 160, laminate 180, and high gloss coating 190. With respect to the foil F layer, it can be seen that there are gaps in the foil layer. These gaps indicate the outline of the foil design shape on sheet media 10. In this regard, foil F is transferred to sheet media 10 only where there are corresponding outline reliefs in the surface of the die in the stamping press.

The refractive foil F, laminates 140 and 180, inks 150, aqueous coating 160, and high gloss coating 190, work together to reflect, refract and bend light so as to give the image appearing upon sheet media 10 an appearance of depth, dimension, contrasts, glow and brilliance.

The foregoing description is a specific embodiment of the present invention. It should be appreciated that this embodiment is described for purposes of illustration only and that numerous alterations and modifications may be practiced by those skilled in the art without departing from the spirit and scope of the invention. It is intended that all such modifications and alterations be included insofar as they come within the scope of the invention as claimed or the equivalents thereof.

I claim:

1. A process for making a multi-layer metallic-foil printed sheet material comprising the steps of:

positioning a sheet media and a foil sheet having a carrier and metal foil thereon, in a stamping press;

moving a heat transfer plate die into engagement with the carrier of the foil sheet and pressing the sheet media against the foil sheet with the die, said die having reliefs etched therein;

releasing from the foil sheet a metal foil design shape by supplying heat to the die, said metal foil design shape corresponding to the reliefs etched in the die;

bonding the metal foil design shape to the sheet media by means of heat supplied by the die;

applying a first laminate coating over the surface of the sheet media having the metal foil design shape thereon;

applying printing ink to the first laminate coating using an offset printing press;

applying a second laminate coating over the printing ink; and applying a high gloss coating over the second laminate coating.

2. A process for making a multi-layer sheet material as defined in claim 1, wherein an aqueous coating is applied over the printing ink before the second laminate coating is applied, said aqueous coating providing a sealant over the printing ink.

3. A process for making a multi-layer sheet material as defined in claim 2, wherein a spray powder is applied over the aqueous coating to provide a separation layer.

4. A process for making a multi-layer sheet material as defined in claim 1, wherein a spray powder is applied over the high gloss coating to provide a separation layer.

5. A process for making a multi-layer sheet material as defined in claim 1, wherein the process for applying the high gloss coating comprises applying an ultraviolet curable high gloss coating over the second laminate coating.

6. A process for making a multi-layer metallic-foil printed sheet material comprising the steps of:

positioning a sheet media and a foil sheet having a carrier and metal foil thereon in a stamping press;

moving a heat transfer plate die into engagement with the carrier of the foil sheet and pressing the sheet media against the foil sheet with the die, said die having reliefs etched therein;

releasing from the foil sheet a metal foil design shape by supplying heat to the die, said metal foil design shape corresponding to the reliefs etched in the die;

bonding the metal foil design shape to the sheet media by means of heat supplied by the die;

applying a first laminate coating over the surface of the sheet media having the metal foil design shape thereon;

applying printing ink to the first laminate coating using an offset printing press;

applying an aqueous coating over the printing ink to provide a sealing surface;

applying a spray powder over the aqueous coating to provide an off-set surface;

applying a second laminate coating over the printing ink;

applying a high gloss coating over the second laminate coating; and applying the spray powder over the high gloss coating to provide a separation layer.

7. A process for making a multi-layer metallic-foil printed sheet material comprising the steps of:

positioning a sheet media and a foil sheet having a carrier and metal foil thereon, in a stamping press;

moving a heat transfer plate die into engagement with the carrier of the foil sheet and pressing the sheet media against the foil sheet with the die, said die having reliefs etched therein;

releasing from the foil sheet a metal foil design shape by supplying heat to the die, said metal foil design shape corresponding to the reliefs etched in the die;

bonding the metal foil design shape to the sheet media by means of heat supplied by the die;

applying a first laminate coating over the surface of the sheet media having the metal foil design shape thereon;

applying printing ink to the first laminate coating using an offset printing press;

applying a second laminate coating over the printing ink; and applying a high gloss coating to said sheet media.

8. A process for making a multi-layer sheet material as defined in claim 7, wherein an aqueous coating is applied over the printing ink before the second laminate coating is applied, said aqueous coating providing a sealant over the printing ink.

* * * * *